United States Patent [19]

Nilsson

[11] Patent Number: 5,409,658
[45] Date of Patent: Apr. 25, 1995

[54] METHOD AND APPARATUS FOR ORIENTING SUBSTANTIALLY AMORPHOUS PLASTIC MATERIAL IN A BLANK

[75] Inventor: Torsten Nilsson, Löddeköpinge, Sweden

[73] Assignee: PLM AB, Malmo, Sweden

[21] Appl. No.: 50,083

[22] Filed: Apr. 27, 1993

[30] Foreign Application Priority Data

Sep. 27, 1990 [SE] Sweden .................. 9003071

[51] Int. Cl.[6] .................. B29C 49/10; B29C 49/64
[52] U.S. Cl. .................. 264/532; 264/531; 264/292; 425/393; 425/529
[58] Field of Search .................. 264/532, 521, 535, 291, 264/292, 323; 425/392, 393, 529, 526

[56] References Cited

U.S. PATENT DOCUMENTS

| 4,547,416 | 10/1985 | Reed et al. ............... 264/532 |
| 4,564,495 | 1/1986 | Nilsson et al. . |
| 4,631,163 | 12/1986 | Jakobsen et al. . |
| 4,704,243 | 11/1987 | Nilsson et al. ............... 264/531 |
| 4,801,419 | 11/1989 | Ward et al. ............... 264/292 |
| 4,803,024 | 2/1989 | Nilsson ............... 264/521 |
| 4,828,783 | 5/1989 | Albrecht et al. ............... 264/292 |
| 4,847,032 | 7/1989 | Albrecht et al. ............... 264/532 |
| 4,927,591 | 5/1990 | Nilsson ............... 264/532 |

FOREIGN PATENT DOCUMENTS 106425 4/1984 European Pat. Off. .

Primary Examiner—Catherine Timm
Attorney, Agent, or Firm—Keck, Mahin & Cate

[57] ABSTRACT

A method and an apparatus for orienting amorphous plastic material causes the material to be displaced through a gap with a smallest gap width less than the material thickness of the plastic material. During such displacement, the material is oriented, under the formation of a transition zone (18) between as yet unoriented (thicker) material (16b) and oriented (thinner) material (16a). The material is displaced at a speed entailing that crystallization energy released on orientation reaches the defining surfaces (14, 17) of the plastic material at a point in time when the material has already assumed its reduced thickness. The apparatus includes a drawing ring (50) and a mandrel (60), between which the gap is formed. When the plastic material enters into the gap, the gap is of a width which substantially corresponds to the material thickness of the amorphous material. In the direction of displacement of the plastic material, the gap width is reduced so as to be less than the material thickness of the amorphous material, but exceeds the material thickness of the oriented material.

10 Claims, 8 Drawing Sheets

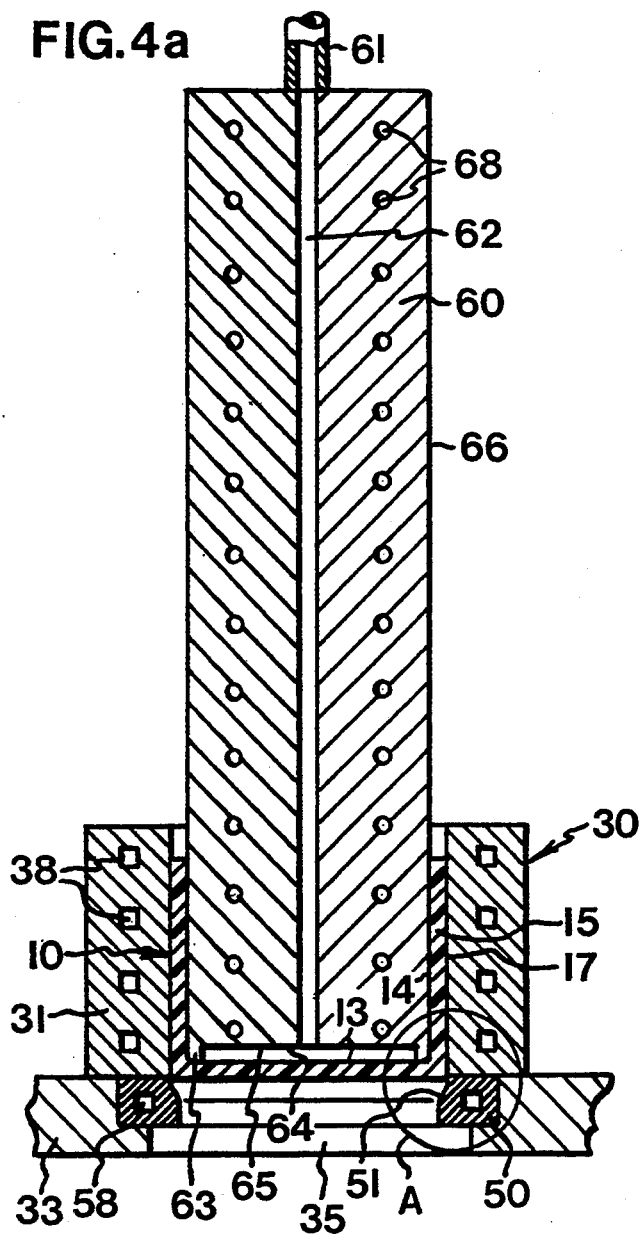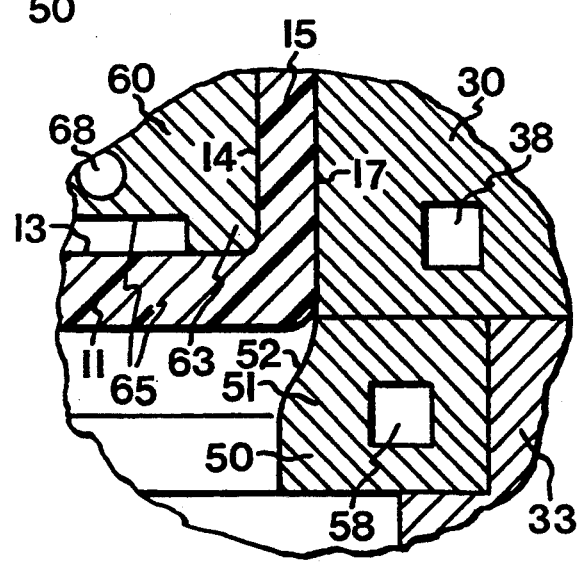

METHOD AND APPARATUS FOR ORIENTING SUBSTANTIALLY AMORPHOUS PLASTIC MATERIAL IN A BLANK

The present invention relates to a method and an apparatus for orienting substantially amorphous plastic material in a blank.

It is previously known in this art to reduce, by means of a mechanical forming device, the material thickness of a blank of plastic material by displacing a transition zone between substantially amorphous plastic material (thick material) and oriented such material (thin material), under the reduction of the quantity of amorphous (thick) material and increase of the quantity of oriented (thin) material. In practical applications in which the above mechanical devices are employed for forming, during the reforming of the blank and during orientation of plastic material included in the blank, a product, as a rule a blank intended to be reformed into a container, at least a portion of the wall of the blank is, in certain applications, caused to pass through a gap which is formed, for example, between a ring, hereinafter designated drawing ring, which surrounds the blank, and a mandrel disposed within the blank. The displacement of the transition zone is realized by a relative displacement between the mandrel and the drawing ring, amorphous material in the blank passing through the gap and being oriented in the direction of displacement of the transition zone. As a rule, the material in the region of the transition zone is brought to a state corresponding to material displacement, whereupon the material, on its passage through the gap, is oriented in a manner corresponding to that orientation achieved by the material if, at the same temperature, it is stretched monoaxially such that material flow occurs. Such a technique is described in U.S. Pat. No. 4,631,163.

In order that the above-described deformation of the plastic material, and thereby the contemplated orientation (crystallization) be ensured, it is necessary int. al. that the plastic material, during its passage through the gap, be temperature conditioned, by which is taken to signify that the defining surfaces of the plastic material are, immediately before the material passes into the gap as a rule at a temperature which at most amounts to a value in the temperature region of the glass transition temperature (Tg) of the material, and preferably located within this range. The term "Tg" will generally be employed hereinbelow to signify the glass transition temperature. Orientation will, granted, be attained also with the plastic material at other temperatures, e.g. at a lower temperature, but, at lower temperatures, it is necessary to work at lower speeds of displacement of the transition zone. At a temperature close to or in the region of Tg, displacement speeds are employed which entail, from the point of view of capital investment, acceptable cycle times for the equipment employed.

The temperature conditioning is necessary in order that the material pass through the gap without breaking and without the occurrence of defects, for example in the form of opaque portions or scratches in the material wall. Such scratches generally arise as a consequence of the friction between the plastic material and the defining surfaces of the gap being excessively high. It is an obvious measure of expedience to a person skilled in the art to attempt to avoid scratches by polishing the abutment surfaces, but in reality it has proved that polishing alone does not solve the friction problem. The reason for this is that, at excessively high temperatures in the plastic material, there occurs a leap-frog increase of the friction on abutment against metal. In, for instance, polyethylene terephthalate (hereinafter abbreviated to PET), a tenfold increase of the friction occurs if the material temperature, when this is in the region of the glass transition temperature, is raised by approx 10° C., One restricting factor in orientation/crystallization of plastic material using a gap through which the material passes during thickness reduction is that energy is released on the orientation/crystallization. The above-described temperature conditioning of the material, before passing into the gap, must therefore be combined in accordance with previously known technology with a temperature control (cooling) of the plastic material when it passes through the gap, i.e. when the transition zone is displaced in the material of the blank. The released energy, including frictional energy between the plastic material and surrounding mechanical material, leads, according to known technology, to a heating of the material which may entail that the abutment surfaces of the material against the walls of the gap assume excessively high temperatures. That energy which is released within the plastic material entails that a hot core of material is formed within the material in that region where material displacement occurs. From this hot core, the energy is led towards the defining surfaces of the plastic material. The hot central core is surrounded in the blank walls by material therein forming the inwardly and outwardly facing defining surfaces of the blank.

Since the inner friction of the hot central core is less than the inner friction of surrounding and cooler material, the material portions located inside the surfaces will, in the event of excessively great differences in the frictional forces applied against the defining surfaces of the material, slide in relation to one another, resulting int. al. in that the initially homogeneous stratum of amorphous material will, after passage through the gap, form three layers of material which are relatively loosely combined with one another. In particular when only one of the material surfaces assumes a temperature which exceedes the temperature range of Tg by more than approx. 10° C., such great differences occur in frictional forces that the above-described strata formation occurs. In, for example, PET, blisters in the material are moreover formed in the central layer. The produced product will, as a result of the above-disclosed defects, be wholly unusable, nor can it be reformed, for example, into a usable container.

The above-mentioned patent specification U.S. Pat. No. 4,631,163 describes a technique in which the above-outlined problems do not occur. The solution disclosed in this patent specification is based on the concept that there prevails, in the transitional zone between amorphous material and oriented material, an energy balance between supplied energy and removed energy at a temperature suitable for the contemplated treatment of the material. According to the technique described in the patent specification, the transitional zone is displaced through a gap under abutment against a forming surface obliquely inclined in relation to the direction of displacement of the transitional zone, this forming surface being included in one of the defining walls of the gap. The obliquely inclined forming surface entails that the opening area of the gap varies in the direction of displacement of the blank. The area of the gap is at its largest in a region where the material of the blank is displaced into the gap, and at its smallest in a region where the material of the blank leaves the gap. In the region of the obliquely inclined forming surface, the defining walls of the gap are provided with ducts for a medium which takes up or emits and transports thermal energy. Hereinafter, the abbreviated expression "thermal medium" will be generally employed for such a medium. During the passage through the gap, the plastic material not only abuts against the obliquely inclined forming surface, but also against the outer defining surface of the mandrel. The abutment against the forming surface and the mandrel is utilized for realizing, by thermal conduction, an energy exchange between the material in the transitional zone and the defining walls of the gap, i.e. to cool the plastic material so that the extent of the hot core will be greatly reduced. This is achieved in that the speed of displacement of the material in relation to the gap is kept so low that the temperature is substantially the same for all material which abuts against the abutment surfaces of the gap, and that the temperature of the material in the core, when the material leaves the gap, is lower than the melting temperature of the material. The above-outlined problems will hereby be avoided.

The above patent specification describes a technique in which, to achieve energy balance between supplied energy and removed energy, the major fraction of the energy which is released in the transitional zone is removed via the obliquely inclined forming surface of the gap. The above disclosed relationship is that which applies in a continued state, i.e. when the transitional zone is displaced in the longitudinal direction of the blank. The described technique requires highly efficient energy transport in the region of the abutment of the obliquely inclined forming surface against the plastic material. Since the major fraction of the energy is released within the plastic material and the material, at such instance, reaches relatively high temperatures (of the order of the melting temperature), the material in that region where it abuts against the obliquely inclined forming surface of the gap will, if the cooling capacity is too low, reach such high temperatures that the undesired leap-frog increase in friction occurs.

In this context, it should also be observed that, when the material passes the transitional zone, the blank undergoes a lengthening. This is determined by the pertinent reduction of the thickness of the wall of the blank, of substantially amorphous material. This lengthening entails that as yet not oriented amorphous material is displaced, for example, in a direction away from the bottom of the blank. This displacement takes place under abutment against the mandrel. Thus, frictional forces occur between the plastic material and the mandrel, for which reason efficient cooling of the material abutting against the mandrel is required. It is particularly necessary to avoid the leap-frog increase in friction in the region of Tg.

The above problem is solved according to the above-disclosed patent specification in that the transitional zone is displaced relatively slowly in order to make possible efficient cooling of the material in the transitional zone and, thereby, such a low temperature of the material that the leap-frog increase in friction does not take place. This relatively slow displacement of the transitional zone in turn results in the energy release on crystallization dissipating in the substantially amorphous material so that this is at an elevated temperature already before the amorphous material is deformed. This in turn results in even higher demands on energy removal in the transitional zone. However, it is obvious that, as a result of the slow displacement of the transitional zone, it is possible satisfactorily to lead off both that energy which is released in connection with the formation/crystallization of the material and that energy which is released by the friction against the outer defining surface of the gap and its inner defining surface, respectively. In other words, the energy is led off sufficiently quickly (efficiently) in order that the material temperature of the plastic material will not be raised to values which entail the leap-frog increase in the friction and/or the undesired relative displacement (sliding) of the outer layers in the material wall. The present invention relates to a method and an apparatus in which the transitional zone is displaced at substantially higher speed than according to prior art techniques and in which the above-outlined drawbacks have been obviated. The present invention is primarily intended to be applied to substantially amorphous plastic material by which is taken to signify a material whose crystallinity amounts to outmost approx. 10%.

The present invention, adapted to the thermal conductivity of the plastic material so that the crystallization energy released in the transitional zone substantially reaches the defining surfaces of the plastic material only once the material has passed that portion of the gap which is of the smallest gap width. Hereby, the material surfaces will, during their passage through the gap, retain the sought-for low temperature, i.e. a temperature which is less than that at which friction undergoes a leap-frog increase. That frictional energy which is released in the transitional zone is not capable of raising the temperature of the plastic material to such high values that the friction forces increase leap-frog fashion. The energy from the hot core reaches the defining surfaces of the material only once the attenuation of material is completed. The material will then already have undergone its lengthening and abuts against the mandrel without being displaced in relation thereto. The material is relatively thin and the mandrel efficiently leads off that energy which reaches the abutment surface of the material against the mandrel.

In one preferred embodiment of the present invention, the plastic material is, before passing through the gap, set at an elevated temperature, which, however, is less than the temperature at which friction is great. In such instance, the heating is generally effected in that the material in the blank, on one or more occasions, abuts against a mandrel disposed within the blank and/or a sleeve which surrounds the blank. In certain practical applications, the sleeve is designed as a holder which is at the elevated temperature. The holder is disposed to be rotated about a centre axis located outside the holder and, in such instance, is disposed to be displaced to mutually subsequently located positions. In at least one of these positions, a displacement of a mandrel to the position within the blank takes place. After the predetermined abutment time against the inner surface of the blank, the mandrel is withdrawn from the blank, whereafter the holder is rotated about the center axis to its next position. During this displacement, an energy wave begins to migrate in a direction towards the outer surface of the blank. In those embodiments in which more than one heating occasion is employed, a mandrel is, after a predetermined time, once again displaced down into the blank, energy being once again supplied to the plastic material of the blank. The mandrel is thereafter moved from the position within the blank and this provides the possibility for displacement by means of the holder to the next position. The number of positions in which the plastic material is heated and the displacement speed of the holder are determined by the thickness of the plastic material in the blank, by the thermal conductivity of the plastic material and by the temperature to which the plastic material is to be heated.

It should be observed that the described embodiment with the blank placed in a holder which is rotated about a center axis located outside the holder provides the possibility of employing different mandrels in each respective position. The temperature and/or material in the abutment surface of each respective mandrel differ in certain embodiments of the present invention from position to position. Hereby, the possibility will be afforded not only of controlling the heating time (abutment time) in each separate position but also of minimizing the risk of tacking tendencies between mandrel and plastic material in each respective position.

In one preferred embodiment of the invention, the speed of the drawing ring in relation to the plastic material of the blank is lower in the initial stage of displacement of the drawing ring. There will hereby be established, in the transitional region between substantially amorphous material and oriented material in the blank, an energy wave caused by the thermal energy which is released in connection with crystallization of the material. As a result of the selected low speed of displacement of the drawing ring, this energy wave will have time to move into the plastic material before the material reaches the gap, whereby the material will attain a temperature suitable for the subsequent orientation (orientation temperature). When such has taken place, it has surprisingly proved possible to achieve a considerable increase in the speed of displacement of the drawing ring. Thus, it applies that the material will withstand an increase of the speed of displacement more than tenfold as compared with the maximum speed applicable in prior art technology without any deterioration in the quality of the oriented material. For example, practical experiments have shown that the speed could be raised from 4 m/min in applying the prior art technique to 45 m/min in applying the new technique. In this instance, the speed of 45 m/min did not constitute an upper limit for the speed at which the process could be carried out with maintained quality of the oriented material.

In certain embodiments, the material is tempered by means of external agents in order to achieve the above-indicated temperature distribution in a cross-section through the material wall, whereby displacement of the drawing ring in relation to the plastic material takes place at maximum displacement speed right from the outset.

The present invention will now be described in greater detail herein below, with particular reference to the accompanying Drawings, in which:

FIG. 4a is a cross-section corresponding to the earlier cross-sections in which an orientation mandrel is inserted in the blank;

FIG. 4b shows the circled area A of FIG. 4a in magnification;

Figure 5A:
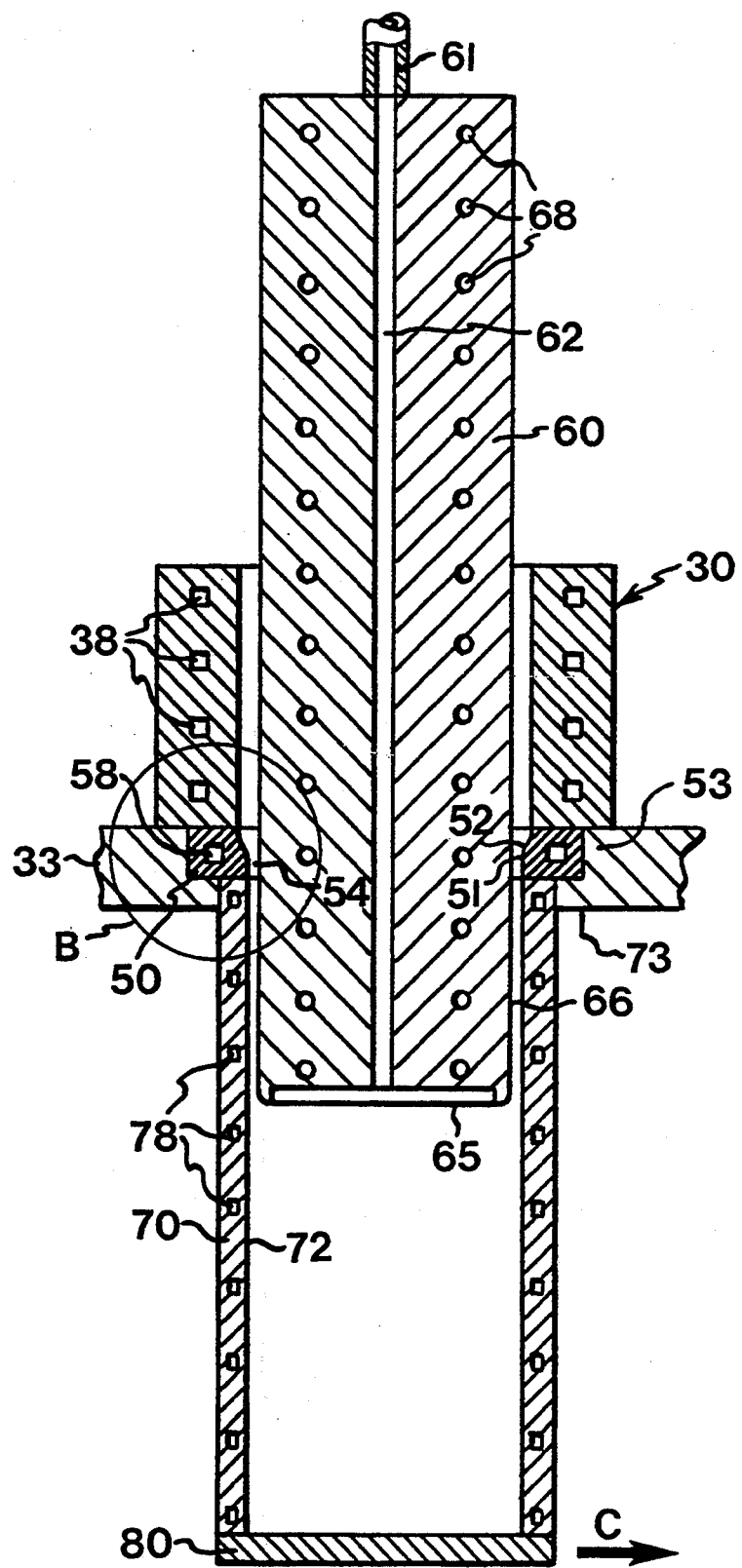
FIG. 5a is a cross section corresponding to the cross-section in FIG. 4 without any blank in the holder and receptacle device, with the orientation mandrel displaced downwardly in the Figure.
Figure 5B:
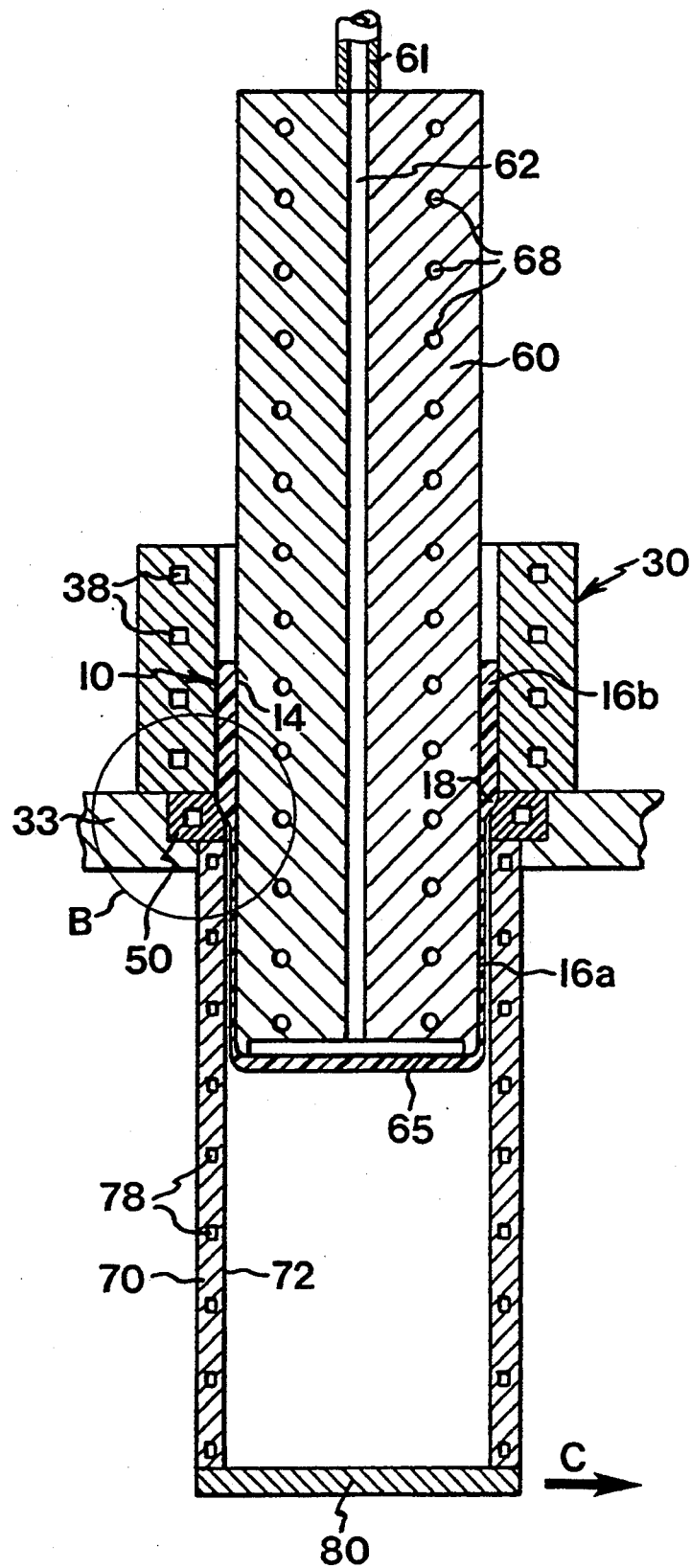
FIG. 5b is a cross-section corresponding to the cross-section in FIG. 5a, showing the blank undergoing reforming.
Figure 6A:
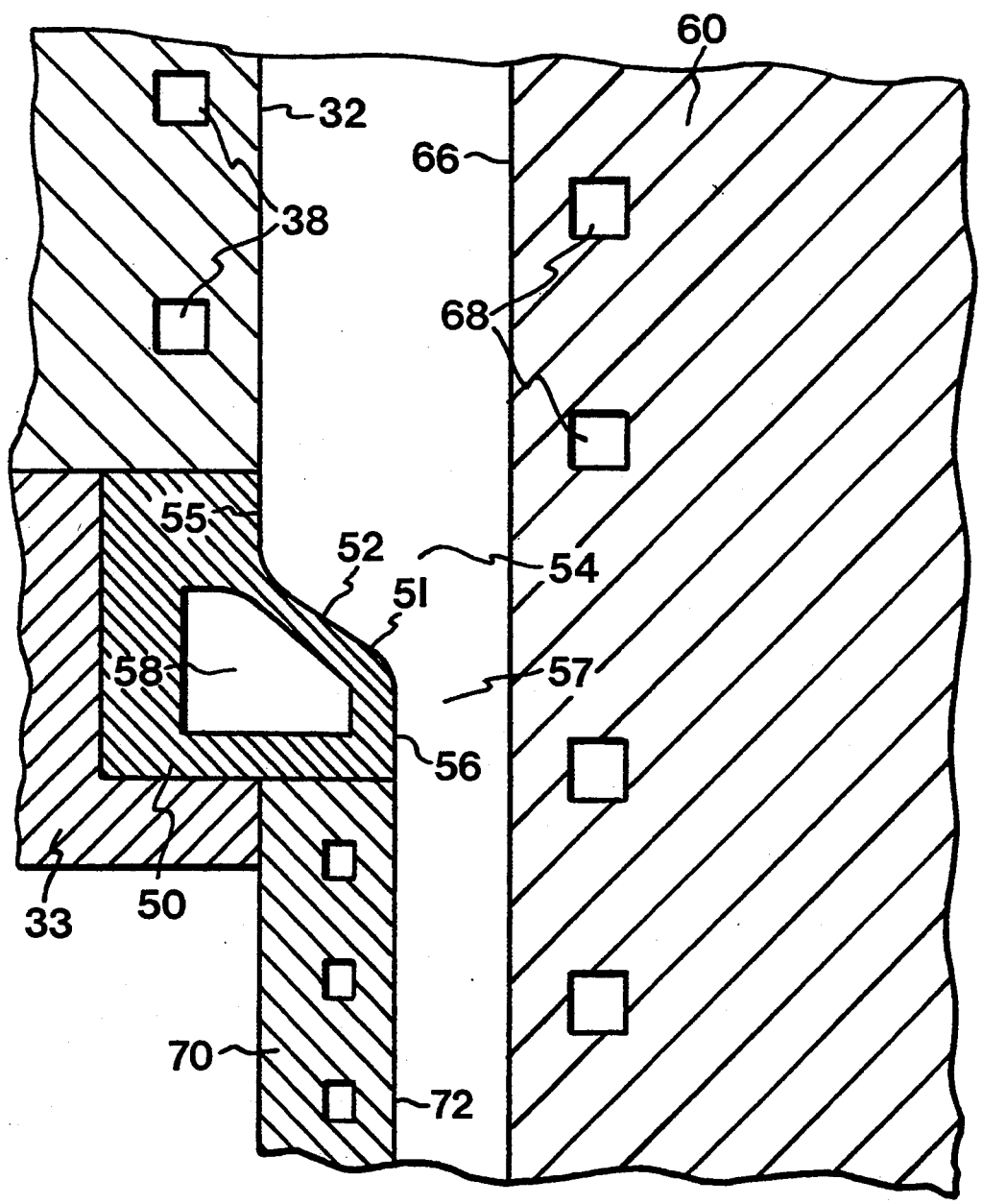
Figure 7:
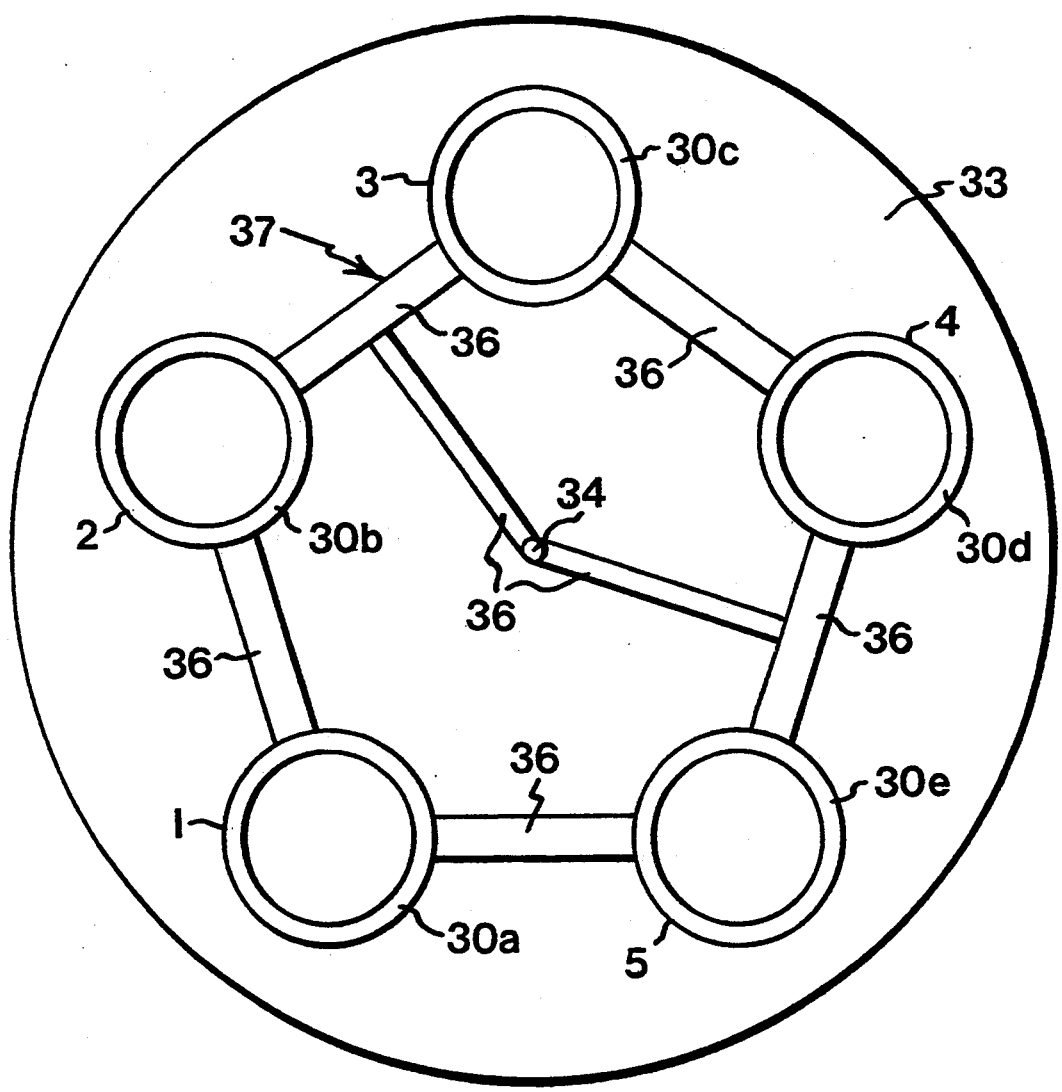

FIG. 6a,b show the encircled region B in FIGS. 5a and 5b, respectively, in magnification; and FIG. 7 is a top plan view of an apparatus for receiving, temperature conditioning and reforming the blank.

The Figures, which show one embodiment of the present invention, depict a blank 10 with a sealed bottom portion 11 and a discharge or mouth portion 12. The blank has an inwardly facing bottom surface 13 and an inwardly facing, generally substantially cylindrical or slightly conical surface 14 which defines the wall 15 of the blank. If the surface is conical, its major circumference is in the mouth portion 12. The outer surface of the wall is designated by reference numeral 17. FIG. 5b shows how the blank has partly undergone reforming, whereby there has been formed a thinner wall portion 16a in the lower region of the blank, while the remaining wall portion 16b still retains its original form. A transitional region 18 is to be found between the wall portion of original thickness and the wall portion of reduced thickness.

At receptacle device 30 (cf. FIGS. 1a and 1b) which also constitutes a holder for the blank is provided with a side wall 31 whose inner defining surface 32 is of a size and configuration substantially corresponding to the outer configuration of the wall 15 of the blank. As a rule, the defining surface is, therefore, gently conical, with its major circumference in the upper region of the holder. Ducts 38 for thermal medium are provided in the side wall. A substrate, for example a plate 33 is disposed beneath the side wall 31 of the holder to support the blank.

A mechanical device, which in the Figures is shown as a mandrel 20 (cf. FIG. 1b) hereinafter unrestrictively designated conditioning mandrel, is defined by a bottom surface 25 and a side surface 26. The mandrel is connected via a drive shaft 21 to drive means (not shown on the Drawings). Such means are provided for displacing the mandrel from the position illustrated in FIG. 1b in which the mandrel is located above the blank, to the position illustrated in FIG. 2 in which the mandrel is inserted in the blank. The conditioning mandrel is disposed to be adjusted at a certain temperature which is adapted to the temperature to which the material of the blank is to be set. To this end, the conditioning mandrel is provided with channels 28 for thermal medium and, after placing within the blank, for either emitting energy to the blank or leading off energy from the blank.

The outer defining surface (side surface) 26 of the conditioning mandrel is dimensioned so as to have a form substantially corresponding to the form of the inwardly facing defining surface 14 of the blank. Hence, the mandrel is as a rule slightly conical in configuration, with its smallest circumference most proximal the bottom surface 25 of the mandrel. As a rule, the dimensions of the blank vary from one blank to another, for which reason the conditioning mandrel is generally dimensioned so as to form a gap 41 between its outer surface 26 and the inner surface 14 of the blank wall when the mandrel is inserted in the blank. In one preferred embodiment, the conditioning mandrel is provided with a first mandrel portion 22 and a second mandrel portion 23 which, by drive means (not shown), are displacable from one another while increasing the circumference of the conditioning mandrel. In such instance, the mandrel portions are separated from one another in the longitudinal section marked by reference numeral 24. It will be obvious to a person skilled in the art that, in certain embodiments, more than two mandrel portions are employed, in particular in practical applications in which the variation in the circumference of the conditioning mandrel is to be large. As is apparent from FIG. 3, at least one gap 27 is formed between the mandrel portions on their displacement from one another. The number of mandrel portions is adapted to the maximum expansion of the blank for which the conditioning device is dimensioned. Hereby, the risk will be avoided that the distance between the mandrel portions in the region of abutment against the blank will be excessively large after completed expansion. In excessively large distance, the material temperature of the blank varies in the circumferential direction of the blank to such high degree that the result of the continued reforming of the blank will be unacceptable. Consequently, the mandrel is generally dimensioned such that the distance is at most of the order of magnitude of the material thickness of the blank prior to reforming.

FIGS. 4a, 4b; 5a, 5b show the receptacle device 30 (the holder) cooperating with an orientation mandrel 60 of substantially cylindrical outer defining surface (side surface) 66. The orientation mandrel is connected via a drive shaft 61 to drive means (not shown). The mandrel has outer dimensions corresponding substantially to the inner dimensions of the blank 10, which implies that, when the mandrel is placed in the position illustrated in FIG. 4a (i.e. with the mandrel inserted in the blank), the side surface 66 of the mandrel abuts at least with its lower portion against the inner surface 14 of the blank. Channels 68 are provided in the orientation mandrel for adjusting the temperature of the side surface 66 of the orientation mandrel. The bottom surface 65 of the mandrel is disposed to abut against the inwardly facing bottom surface 13 of the blank. In the embodiment illustrated in the Figures, the bottom surface of the mandrel is provided with a centrally countersunk region 64. Thereby, the bottom surface of the mandrel forms a circumferential, outer and downwardly projecting edge 63 intended to form the abutment surface of the mandrel against the inwardly facing bottom surface of the blank. As a result of this design, the mandrel abuts against the bottom surface of the blank only in a region adjacent to the wall 15 of the blank. The countersunk region is of a configuration and depth which are adapted to the configuration of the bottom region of the blank in order to ensure that, irrespective of the configuration of the inwardly facing bottom surface of the blank, the mandrel abuts against the bottom surface of the blank only in the annular region adjacent the wall of the blank.

FIGS. 4a, 4b; 5a, 5b; 6a, 6b show how the substrate 33 is provided with an aperture 35 of a size entailing that it permits the blank to pass through the aperture. In FIGS. 4a, 4b, the blank is still fixed by the holder 30 as a result of expansion of the blank into abutment against the holder. In those embodiments in which the inner defining surface of the holder is conical, retention of the blank will naturally be improved. In association with the aperture, there is provided a drawing ring 50 with a circumferential region 51 in which the inner circumference of the drawing ring is reduced from a larger value most proximal the blank to a lesser value more distal from the blank (cf. FIGS. 4a and 6a). This circumferential region is defined towards the centre of the aperture by a work surface 52. The work surface is preceded in the drawing ring by an entry surface 55 located most proximal the holder 30 and is followed by an exit surface 56 located most distally from the holder. Both the entry surface and the exit surface are oriented substantially parallel with the side surface 66 of the orientation mandrel. The reduction of the inner circumference of the drawing ring is effected with the aid of the work surface which makes an oblique angle with both the entry surface and the exit surface and connects these. In a plane transversely of the the axial direction of the holder 30, the work surface is, where it merges in the entry surface, located more proximal the holder than where it merges in the exit surface. The drawing ring 50 is provided with one or more ducts 58 for thermal medium for adjusting the temperature of the entry surface 55 and work surface 52 of the drawing ring, and, in certain practical applications, also its exit surface 56. Between the drawing ring and the orientation mandrel, a gap 54 (hereinafter designated drawing ring gap 54) is formed with the drawing ring inserted in the aperture, the gap 54 having a gap width which is less than the material thickness of the blank 10. The drawing ring gap has its smallest gap width in a portion 57 of the drawing ring which is located between the exit surface 56 and the orientation mandrel 60.

Figure 6B:
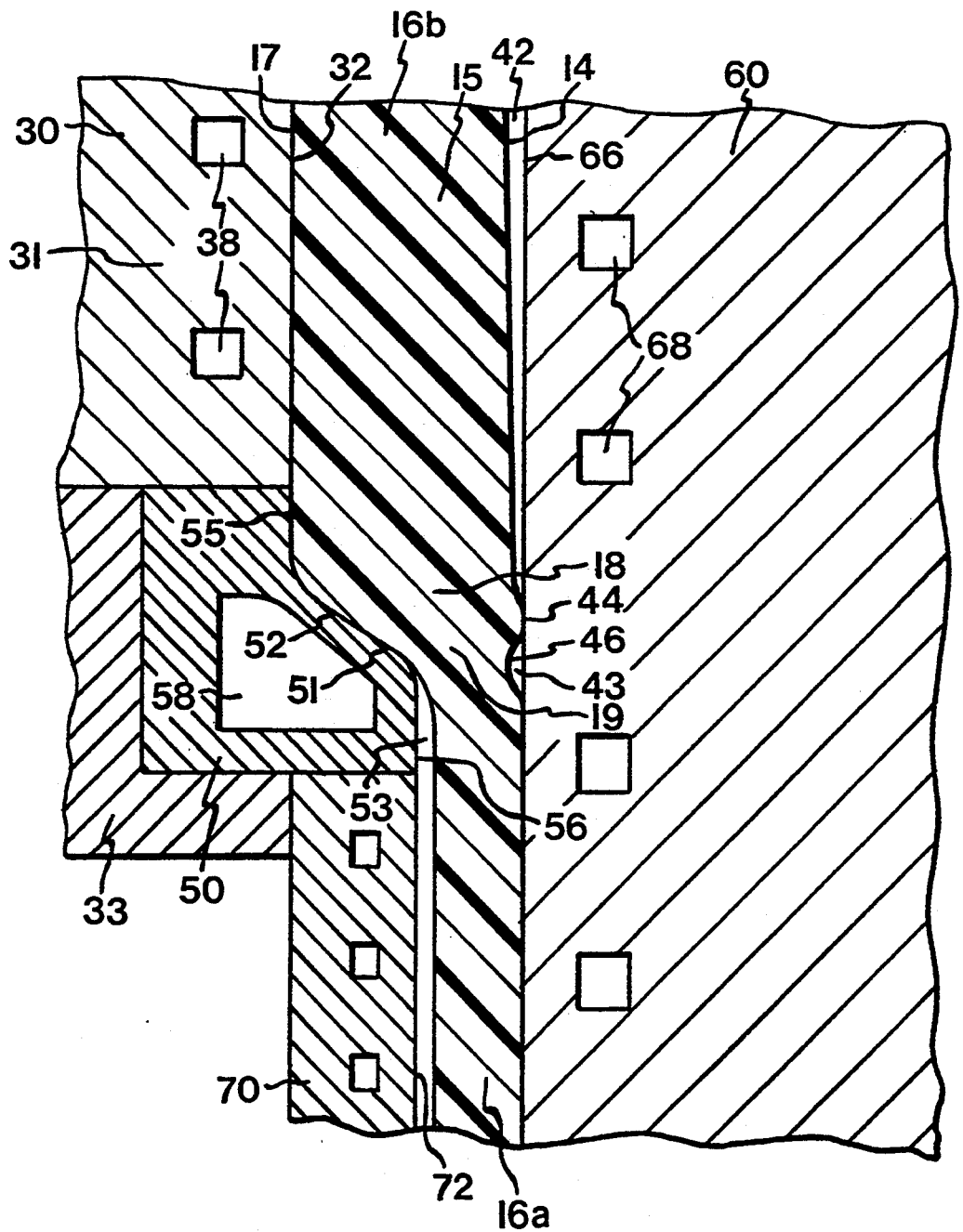

FIGS. 6a–b illustrate in detail the design of one preferred embodiment of the apparatus in the region of the drawing ring 50 and, moreover, show the appearance of the blank 10 in the region of the drawing ring gap 54 during the actual reforming cycle. In this region, there is to be found the transitional region 18 between that wall portion 16b which is of original material thickness and that wall portion 16a which is of reduced material thickness. It will be apparent from the Figure that the blank is shown in one embodiment in which the inwardly facing defining surface 14 of the blank wall 15 forms a conical surface whose circumference increases towards the mouth portion of the blank. Since the orientation mandrel 60 is substantially cylindrical, a gap 42 is formed between the side surface 66 of the mandrel and the defining surface 14, this gap having a width which increases towards the mouth of the blank. Where the transitional region 18 merges in the thinner wall portion 16a of the blank wall, the blank wall abuts against the orientation mandrel in a circumferential region 44 and with relatively slight extent in the axial direction of the blank. It is apparent from FIG. 6b that the material of the blank abuts not only against the side wall 31 of the holder 30 but also against the inner defining surface of the drawing ring before the material, on passage of the work surface 52 of the drawing ring is deformed thereby so powerfully that the material is oriented/crystallized. On such abutment, the temperature of the plastic material is adjusted, at least in a surface layer of the material, to a temperature adapted for the subsequent treatment. In PET the inner defining surface of the side wall has, in one preferred embodiment, a temperature in the range of Tg (e.g. approx. 75° C.) while the inner defining surface of the drawing ring is at lower temperature, preferably at least approx. 5° C. lower and generally at least approx. 10° C. lower.

After the transitional region 18, there follows a region 19 in which the blank wall, and thereby its inner defining surface 14, bulges out from the mandrel. This region is located substantially where the narrowest portion of the drawing ring gap begins (seen in the direction of displacement of material through the gap). That portion of the defining surface 14 of the blank wall which bulges out from the mandrel is generally designated a slip surface 46. The slip surface is of relatively slight extent in the axial direction of the blank. A circumferential, annular gap 43 is formed between the slip surface and the mandrel.

In the region 19 of the slip surface 46, the blank wall has already assumed its reduced thickness. Furthermore, the drawing ring gap is, as a rule, dimensioned such that its smallest gap width exceeds that thickness assumed by the blank wall on orientation/crystallization of the material. Moreover, below the annular gap 43, the blank wall 15 (now in the form of the wall 16a of reduced material thickness and consisting of oriented/crystallized material) once again abuts against the orientation mandrel. There will therefore be formed, between the blank wall 16a of reduced material thickness and the exit surface 56 of the drawing ring 50, a gap, as soon as the material in the blank wall has passed the work surface 52 of the drawing ring. Hereby, all friction between the outer surface of the blank wall and the drawing ring will be avoided in the narrowest portion 57 of the drawing ring gap 54.

FIGS. 5a-b and 6a-b, respectively, also encompass an embodiment in which the apparatus is provided with a calibration sleeve 70 which connects to the drawing ring 50. The calibration sleeve is place such that the sleeve and the holder 30 are located on either side of the drawing ring. The calibration sleeve is provided with channels 78 for thermal medium. The inner defining surface 72 of the calibration sleeve has a minimum circumference and configuration which substantially correspond to the inner circumference and configuration of the exit surface 56, i.e. in a cross section through the drawing ring and through the calibration sleeve, respectively, both of the surfaces are of corresponding configuration. The corresponding configuration implies that both of the surfaces have a uniform transition into one another. However, in certain practical applications the inner defining surface of the calibration sleeve is of greater circumference than the exit surface of the drawing ring. The calibration sleeve and drawing ring, respectively, are disposed to be releasably secured in the substrate 33, for example in that both the substrate 33 and these two devices are provided with inner and outer threads, respectively, by means of which these devices are connected to the substrate. A base plate 80 is disposed to be displaced by drive means (not shown) to and from the position illustrated in FIGS. 5a-b, where the plate constitutes a bottom support 80 in the calibration sleeve 70. The arrow C illustrates one embodiment in which the base plate is displaced transversely of the axial direction of the calibration sleeve. It will be obvious that, in other embodiments, the base plate (for example in the form of journal) is pivoted about a horizontal axis to and from the position shown in the Figure.

FIG. 7 shows one preferred embodiment of the present invention in which the substrate plate 33 is disposed beneath a composite unit 37 formed by a number of receptacle cups (holders) 30a-30e, which, by connection means 36, are fixed to one another. In such instance, the cups or holders are, as a rule, designed as gently conical tubes 30a-30e open at both ends. The largest opening of the holders is turned to face upwardly. The composite unit is connected, via connection devices, to a centre shaft 34 about which drive means (not shown) rotate the unit to determined positions in which the combinations of devices described above in connection with FIGS. 1-6 are formed. In certain practical applications, the centre shaft is fixedly connected to the composite unit in order to rotate this. The rotary movement about the centre of the composite unit is, as a rule, indexed such that the holders are, at preset intervals, located in one of the positions indicated by reference numerals 1-5. The displacement of the holders to positions 1-5 is effected by relative movement in relation to the substrate 33 which, as a rule, has a fixed position.

Figure 1A:
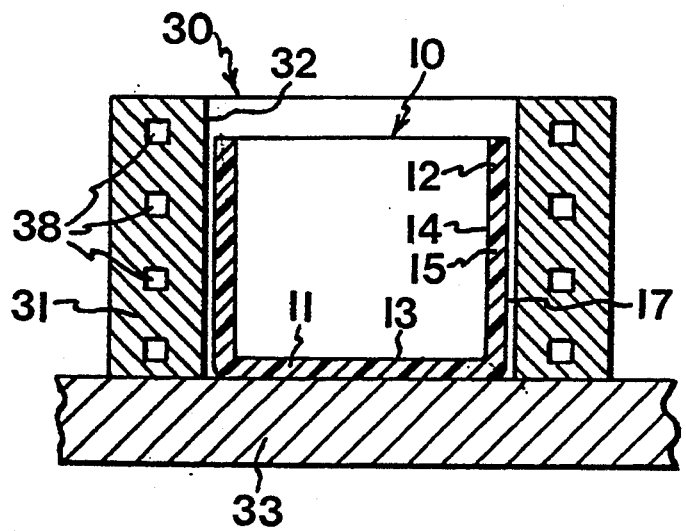
FIG. 1a is a cross-section through a combined holder and receptacle device for a blank.
Figure 1B:
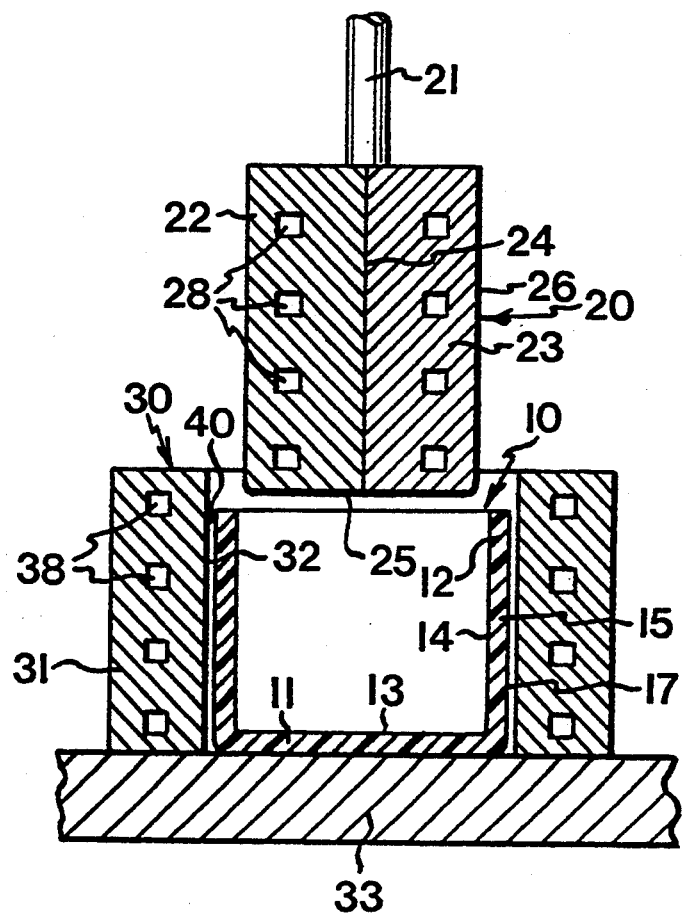
FIG. 1b is a cross-section corresponding to the cross-section of FIG. 1a with a conditioning mandrel located above the holder.
Figure 2:
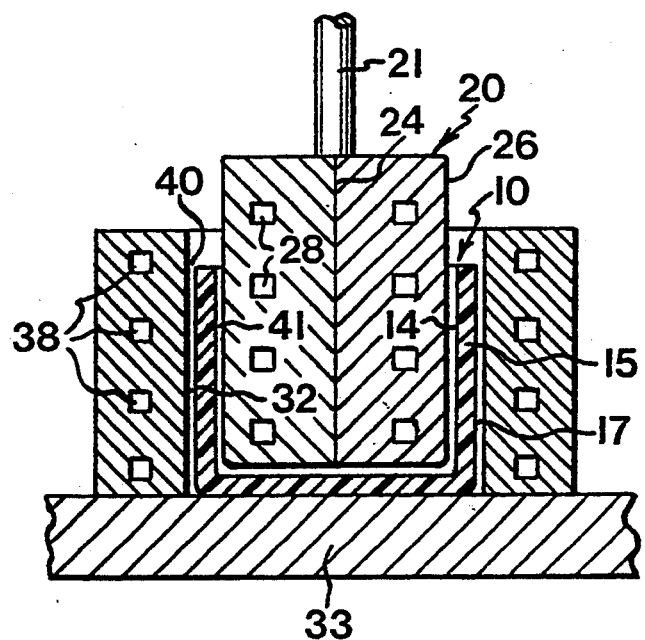
FIG. 2 is a cross-section corresponding to the cross-section in FIG. 1 in which the conditioning mandrel is inserted in the blank.
Figure 3:
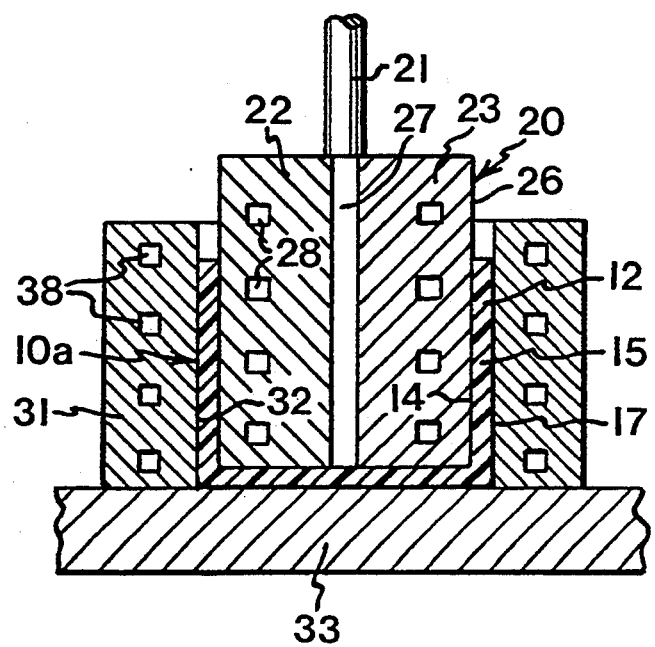
FIG. 3 is a cross-section corresponding to the cross-section in FIG. 2 in which the conditioning mandrel has been expanded.

In position 1 which corresponds to FIG. 1a, the blank 10 is received by the receptacle device (the holder) 30a which, in FIG. 7, is located in position 1. Positions 2, 3 and 4 each correspond to those combinations of devices as shown in FIGS. 1b, 2 and 3 and position 5 corresponds to the combination of devices illustrated in FIGS. 4a, 4b; 5a, 5b; 6a, 6b. In the region corresponding to the position 5 for the holder 30e, the plate 33 is provided with the aperture 35 and the drawing ring 50. In the embodiment illustrated in FIG. 7, the apparatus permits, as necessary, the blank to be temperature conditioned on a maximum of three occasions. It is clear that the number of positions may be increased or reduced for, for example, adaptation of the equipment to the number of requisite temperature conditioning occasions.

The apparatus includes control and regulator devices (not shown on the Drawings) for displacing the conditioning mandrel and orientation mandrel, respectively. Such control and regulator devices not shown on the Drawings are provided for controlling and regulating the movements and expansion of the conditioning mandrel and thereby also that time interval during which the mandrel, after expansion, abuts against the inner defining surface of the blank wall. Control and regulator devices (not shown) are also provided for controlling the speed of displacement of the orientation mandrel and adjustment of the temperature of the thermal medium supplied to the conditioning mandrel 20, the orientation mandrel 60, the holder 30, the drawing ring 50, and, where applicable, the calibration sleeve 70.

When the present invention is reduced into practice, the blank 10 is displaced, in one preferred embodiment corresponding to that described in connection with FIG. 7, into the receptacle device (the holder 30a), to the position illustrated in FIG. 1a. Thereafter, the composite unit 37 is rotated one step, whereby the holder 30a is moved to position 2. During such displacement, the holder is located just above the upper defining surface of the substrate plate 33, while blank is fixed by the holder and, as a rule, slides on the defining surface. In position 2, the conditioning mandrel 20 is displaced from an upper position, cf. FIG. 1b, to a lower position, cf. FIG. 2. In the upper position, the conditioning mandrel is located above and outside the blank and, in the lower position, within the blank. In one preferred embodiment, the conditioning mandrel is dimensioned so as to form, with its outer defining surface 26, the gap 41 together with the inner defining surface 14 of the blank. In those practical applications in which the blank is of conical configuration, this conicity generally ensures that the gap is obtained.

The circumstance will hereby be avoided that the inwardly facing surface 14 of the blank is in contact with the mandrel 20 during its displacement into the blank, this thereby also, for example, avoiding the risk of uncontrolled heating of the material of the blank and thereby risk of undesired friction between mandrel and plastic material.

In view of varying sizes of the blanks, the holder 30 is, in one preferred embodiment, also dimensioned so as to form a gap 40 between itself and the outwardly facing defining surface 17 of the blank. The conditioning mandrel is thereafter expanded into abutment against the inner defining surface of the blank and, thereafter, as a rule a slight further distance so as to displace the material of the blank outwardly into reliable abutment against the inwardly facing defining surface 32 of the holder. The expansion of the conditioning mandrel is controlled so as to continue until such time as the blank, with its outer surface, abuts against the inner surface of the holder. There will hereby be achieved reliable contact between the conditioning mandrel and the blank and between the holder and the blank, and good control of the energy transfer between the blank and the mandrel and the holder, respectively. In one preferred embodiment, use is made of a relatively slight expansion—as a rule limited to at most approx. 20% and preferably to at most approx. 10%. In the event of slight expansion, but a few mandrel parts will be required, while in larger expansion the number of mandrel parts is increased in order to reduce the width of those gaps which are formed, on expansion, between the mandrel parts. There will thereby be ensured a uniform heating of the plastic material. By means of thermal medium in the channels 28 and 38, respectively, of the conditioning mandrel and the holder, the temperature in the abutment surfaces of the mandrel against the blank will be adjusted. In one preferred embodiment, the conditioning mandrel 20 and the holder 30 are conical, with their major circumference most proximal the upper region of the mandrel and the holder, respectively.

The following examples of employed temperatures and times may be disclosed for temperature conditioning of PET. The temperature of the outer surface 26 of the conditioning mandrel 20 is, as a rule, in excess of the region of Tg and, in such instance, by at least 10° C., as a rule by at least 30° C. and preferably by at least 50° C. By means of control and regulation devices, the time is set for the abutment of the conditioning mandrel against the inner surface of the blank, this being selected to be at most approx. 5 sec., normally at most approx. 3 sec. and preferably at most approx. 2 sec. Naturally, the abutment time employed is adapted to the temperature of the conditioning mandrel and the properties of the plastic material. The temperatures and times disclosed in this paragraph relate to temperature conditioning of a blank of PET whose wall thickness is of the order of magnitude of 2 mm. It is obvious that, for other plastic materials and/or other dimensions of the blank, the conditioning time is adapted to meet the relevant situation.

Once the conditioning mandrel has abutted against the blank during the predetermined time, the mandrel is contracted, whereafter it is withdrawn from the blank. This is then displaced to the next position (position 3), where, if applicable, a renewed abutment takes place of the conditioning mandrel of this position against the material of the blank for exchange of thermal energy between mandrel and blank. Also in this position, the abutment time is regulated corresponding to that disclosed in the preceding paragraph. It will be obvious to the skilled reader that the cycle for temperature conditioning of the blank may be repeated in an individual station by allowing the mandrel to run through the above-outlined skeleton diagram more than once with the holder retained in the same position.

Having passed positions 2–4 for temperature conditioning, the blank is moved to position 5. In such instance, the blank is generally retained by the holder 30 in a position above the work surface 52 of the drawing ring 50 (cf. FIG. 4b). When the holder has assumed position 5, the orientation mandrel 60 is displaced downwardly and through the aperture 35 in the base plate 33, the bottom surface 65 of the mandrel displacing the blank 10 through the aperture under abutment against the inwardly facing bottom surface 13 of the blank, at least in a region most proximal the wall 15 of the blank. As a rule, the mandrel placed within the blank is disposed to cool, with its defining surface 66, the inwardly facing defining surface of the blank wall 15 at least in the material which has passed through the drawing ring gap. On displacement of the orientation mandrel, a transitional region is formed between thinner (oriented) and thicker (amorphous) material. On displacement of the orientation mandrel, the transitional zone is shifted in the axial direction of the blank and into the amorphous material, under simultaneous reduction of the quantity of amorphous material. Hereby, the material of the wall 15 will be oriented in an axial direction when the material passes the work surface 52. Depending upon the desired practical application of the present invention, all material in the blank will be oriented, or solely a part thereof. In practical applications in which all material in the wall of the blank obtains reduced material thickness, the reformed blank will be in a position beneath the drawing ring once the movement of the orientation mandrel has been completed. A channel 62 for pressure medium is provided for releasing the reformed blank from the orientation mandrel. Once the orientation mandrel has returned to its starting position, the holder 30 is displaced to position 1, whereafter the above-described cycle is repeated.

In one preferred embodiment, the orientation mandrel is dimensioned for forming with its outer defining surface 66, the gap 42 with the inner defining surface 14 of the blank in that part 16b of the blank wall which is of original thickness. Hereby, the blank wall portion 16b of original thickness will be precluded from abutting against the orientation mandrel 60 in connection with that lengthening of the blank and displacement of the wall portion in relation to the mandrel which take place when the material in the blank is displaced by the orientation mandrel through the drawing ring gap 54. Such measures avoid the risk of those frictional forces and scratch damages which would occur on displacement of the wall portion 16b along the mandrel if the wall portion had abutted at the same time thereagainst.

The temperature of the holder 30 is generally adjusted at a value which at most amounts to a temperature at which the thermoplastic material begins to thermocrystallize. As a rule therefore, such adjustment is set at a temperature within the region of the Tg of the thermoplastic material, but, in certain practical applications, to a temperature below Tg. As far as PET is concerned, a temperature of at most approx. 85° C., preferably at most approx. 80° C. has proved to entail a good temperature distribution in the wall of the blank. It is obvious that the temperature of the side wall of the holder will be adjusted to a temperature entailing that the outwardly facing defining surface of the blank wall, will, on passage into the drawing ring gap 54, have a temperature which is less than the temperature at which the above-described leap-frog increase of friction occurs. While maximum values have been disclosed above of 85° C. and 80° C., respectively, considerably lower temperatures are employed in certain practical applications, for example a maximum of 75° C., or alternatively 65° C.

Since all of the mechanical devices which are in contact with the plastic material consist of material of good thermal conductivity coefficient (as a rule metals) an adjustment and regulation will be achieved according to the present invention within narrow tolerances of the temperature of the thermal plastic material in all stages of the above-described cycle. This is particularly important in the transitional region 18 of the wall material of the blank—which is that region where the material of the blank abuts against the work surface 52 of the drawing ring and where the material thickness of the blank is reduced. In this region, the abutment pressure between the material of the blank and the drawing ring is at its highest and, thereby, also the frictional forces. Since the above-described adjustment of the material temperature in the region of the outer definition of the blank wall entails that the thermoplastic material, on its passage into the drawing ring gap, is at a temperature below the temperature of the leap-frog increase of friction, frictional forces are reduced to a minimum and, thereby, also that energy which is developed as a result of the friction.

In the transitional region, the blank wall in the annular region 44 is brought into abutment against the orientation mandrel 60. Also here, the plastic material is at a temperature which is less than the temperature at which the leap-frog increase of the friction occurs, for which reason the energy formed by friction in this region is slight and, as a result, does not entail such a large increase of the temperature of the plastic material that the frictional forces increase in leap-frog fashion. The plastic material thereafter passes into the narrowest portion of the drawing ring gap 54 and has, already on its passage into this region of the drawing ring gap, assumed its final thickness. In such instance, the material forms a gap 53 with the drawing ring and also, in a shorter region, the above-disclosed annular gap 43 between the material and the exit surface 56 of the orientation mandrel. Below the annular gap, the material is once again brought into abutment against the orientation mandrel. When it achieves renewed contact with the orientation mandrel, the material has its final, reduced thickness and also its final length, which implies that relative movement between the plastic material and the mandrel no longer occurs on the continued displacement of the mandrel in relation to the drawing ring. The defining surface 66 of the orientation mandrel is set at a temperature which is less than the Tg of the plastic material by at least 5° C., preferably at least 10° C. Nor does any friction occur between the outer defining surface 17 of the thin plastic material and the exit surface 56 of the drawing ring, since there is also a gap here. In PET the normal temperature for the work surface 52 of the drawing ring is at most 75° C., and as a rule at most 65° C.

The speed of displacement of the orientation mandrel in relation to the drawing ring is selected such that the energy which is released in the material when this is oriented in connection with its passage through the drawing ring gap does not have time to reach the defining walls of the plastic material before the plastic material has released contact with the drawing ring. Thus, the released energy will have reached the inner defining surface of the plastic material at the earliest when the material passes into the narrowest portion of the drawing ring gap, which implies that that elevation of the material temperature which occurs takes place for plastic material which is not in contact with the drawing ring or for plastic material which does not describe any movement in relation to the orientation mandrel. The outer surface of the oriented material is wholly free of contact with mechanical devices once the material has passed through the drawing ring gap.

In those embodiments in which the calibration sleeve illustrated in connection with FIGS. 5a-b and 6a-b is included, the defining wall of this sleeve facing towards the plastic material is at a relatively low temperature, as a rule a temperature less than the glass transition temperature of the material by at least 15° C., preferably by at least 30° C. and as a rule by at least 45° C. When the orientation mandrel has been displaced to its end position and, as a rule, all material in the blank has passed through the drawing ring gap, pressure medium is supplied through the pressure medium channel 62 of the orientation mandrel, the material of the blank being expanded into abutment against the calibration sleeve 70. This expansion is relatively slight, since the distance between the blank wall and the calibration sleeve is at most of the order of magnitude of one half a wall thickness. The above-disclosed abutment against the calibration sleeve entails that the expanded blank is fixedly retained by the calibration sleeve and the orientation mandrel is displaced out of the blank. The bottom support is removed from the position illustrated in FIGS. 5a-b. An intermittent increase of the pressure within the blank takes place at the latest when there only remains a short displacement distance for the orientation mandrel before the mandrel has been wholly withdrawn from the blank. The increase in the pressure entails that the blank, which is no longer supported by the bottom support, is blown out of the calibration sleeve. As a rule, the time for abutment of the plastic material against the calibration sleeve is selected to be at least so long that the plastic material assumes a temperature below the temperature for Tg. By the abutment against the calibration sleeve and that cooling of the plastic material which then occurs, the final forming of the blank is effected and the blank has assumed a final form corresponding to the inner configuration of the calibration sleeve.

Both during passage through the drawing ring gap 54 and thereafter (as well as during the previously described temperature conditioning cycle), the side wall 31 of the holder 30 has, via its defining surface 32 facing towards the blank, influenced the temperature distribution in the blank. In certain practical applications and/or positions, the defining surface 32 is at a lower surface temperature than the side surface 26 of the conditioning mandrel 20, while in other practical applications and/or positions the defining surface 32 is at a surface temperature which exceeds the surface temperature of the side surface 26 of the conditioning mandrel. In the normal case, the side surface 32 of the holder is at a temperature which is less than or in the region of Tg.

On displacement by the drive means of the orientation mandrel 60 through the aperture 35, the orientation mandrel shunts the sealed bottom portion 11 of the blank ahead of it, at the same time as the orientation mandrel forms, between itself and the drawing ring 50, the drawing ring gap whose size at PET at most amounts to approx. half of the material thickness of the original blank, which consists substantially of amorphous material. By this is taken to mean thermal plastic material with a crystallinity amounting at most to approx 10%. As a result of the relative displacement of the orientation mandrel 60 in relation to the drawing ring 50, and thereby the displacement of the bottom portion of the blank, the material wall in the blank is forced to pass through the drawing ring gap 54 whereby the material thickness of the wall of the blank is reduced under simultaneous monoaxial orientation/crystallization of the material of the blank.

Thus, during displacement of the orientation mandrel, the quantity and length of the monoaxially oriented material will progressively increase, while, at the same time, the quantity and length of the amorphous material is reduced. In practical applications in which all material in the wall of the blank passes through the gap, all material in the wall, will, thus, be oriented. With the aid of the channels 38, 58 and 68 in the wall 31 of the holder 30, in the drawing ring 50 and in the orientation mandrel 60, respectively, the material temperature of the abutment surfaces of the material in the transitional region 18 is regulated. It thus applies, that, for amorphous material, i.e. material which has not yet passed through the gap, a final adjustment takes place of the temperature at least in surface layers of the material of the blank by means of the orientation mandrel 60, the side wall 31 of the holder 30, the entrance surface 55 of the drawing ring 50 and—also to some extent—by means of the work surface 52 proper. That energy which is released during the orientation cycle is displaced by the plastic material past the mechanical defining surfaces which surround the transitional region and reaches the defining surfaces of the plastic material to such an extent that the temperature of the surface layers is elevated to the region of the leap-frog increase in friction only once the thickness reduction of the material has been completed.

In certain embodiments, the channels for thermal medium in the holder 30 and the orientation mandrel 60 are replaced by electric resistor wires. Only when the holder 30 and/or the orientation mandrel 60 are employed for cooling material in the the blank are the channels disposed for regular transport of thermal medium.

The above detailed description has referred to but a limited number of embodiments of the invention, but a person skilled in the art will readily perceive that the present invention encompasses a large number of embodiments within the spirit and scope of the appended claims.

I claim:

1. A method for orienting substantially amorphous plastic material in a blank (10) in apparatus including forming devices (50, 60) which define a gap (54), the gap having a portion (57) whose gap width is less than the material thickness of the material of the blank, comprising:
   displacing at least parts of the blank through the gap, thereby reducing the thickness of the plastic material and orienting the plastic material;
   wherein said portion (57) has a gap width exceeding the thickness imparted to the plastic material on orientation by said forming devices (50, 60) which form the gap (54), the gap (54) being formed between a drawing ring (50) and a mandrel (60) which is surrounded by the drawing ring, the drawing ring and the mandrel being disposed to be displaced in relation to one another in the axial direction of the mandrel, the surface of the drawing ring (50) facing the mandrel (60) including a work surface (52) obliquely inclined in relation to the axial direction of the mandrel, said work surface having, in the direction of displacement of the plastic material in relation to the drawing ring, a continually reducing distance to the defining surface (66) of the mandrel (60), and said work surface being followed by and connecting to an exit surface (56) whose smallest distance to the defining surface of the mandrel exceeds that thickness assumed by the plastic material on orientation; a calibration sleeve (70) being provided in connection with said exit surface (56) of the drawing ring (50), the mandrel (60) and the calibration sleeve (70) being disposed, by a relative movement, to displace the mandrel into the calibration sleeve; the inner defining surface (72) of the calibration sleeve, with the mandrel displaced into the sleeve, forming a gap with the defining surface (66) of the mandrel whose width exceeds the material thickness of the oriented material; the calibration sleeve (70) being provided with channels (78) for temperature adjustment of the inwardly facing surface (72) of the sleeve; and the mandrel (60) being provided with means (62) for supplying a pressure medium to the interior of the blank comprising oriented material, for expansion of the blank wall into abutment against the inwardly facing surface of the calibration sleeve when the blank is displaced by the mandrel into the calibration sleeve.

2. An apparatus for orienting substantially amorphous plastic material in a blank (10), the apparatus including forming devices (50, 60) which define a gap (54), the gap having a portion (57) whose gap width is less than the material thickness of the material of the blank, and means for displacing at least parts of the blank through the gap for reduction of the thickness of the plastic material and for orientation of the plastic material, wherein said portion (57) has a gap width exceeding the thickness imparted to the plastic material on orientation by said forming devices (50, 60) which form the gap (54); the gap (54) being formed between a drawing ring (50) and a mandrel (60) which is surrounded by the drawing ring; the drawing ring and the mandrel being disposed to be displaced in relation to one another in the axial direction of the mandrel; the surface of the drawing ring (50) facing the mandrel (60) including a work surface (52) obliquely inclined in relation to the axial direction of the mandrel, said work surface having, in the direction of displacement of the plastic material in relation to the drawing ring, a continually reducing distance to the defining surface (66) of the mandrel (60), and said work surface being followed by and connecting to an exit surface (56) whose smallest distance to the defining surface of the mandrel exceeds that thickness assumed by the plastic material on orientation; a calibration sleeve (70) being provided in connection with said exit surface (56) of the drawing ring (50), the mandrel (60) and the calibration sleeve (70) being disposed, by a relative movement, to displace the mandrel into the calibration sleeve; the inner defining surface (72) of the calibration sleeve, with the mandrel displaced into the sleeve, forming a gap with the defining surface (66) of the mandrel whose width exceeds the material thickness of the oriented material; the calibration sleeve (70) being provided with channels (78) for temperature adjustment of the inwardly facing surface (72) of the sleeve; and the mandrel (60) being provided with means (62) for supplying a pressure medium to the interior of the blank comprising oriented material, for expansion of the blank wall into abutment against the inwardly facing surface of the calibration sleeve when the blank is displaced by the mandrel into the calibration sleeve.

3. A method of orienting substantially amorphous plastic material in a blank (10) in which the plastic material is caused to be displaced through a gap (54) with a minimum gap width which is less than the material thickness, the material being oriented under the formation of a transition zone (18) between as yet not oriented (thicker) material (16b) and oriented (thinner) material (16a), comprising:

displacing the blank through the gap (54) at a speed of at least about 45 m/min; and orienting the material;

wherein the blank is displaced at a speed entailing that crystallization energy released in the orientation substantially reaches the defining surfaces (14, 17) of the plastic material at a point in time when the material has already assumed its thinner oriented thickness, wherein the blank (10) is given substantially tubular form, the gap (54) being defined by a drawing ring (50) which surrounds a mandrel (60) and which, by relative displacement in relation to the mandrel, displaces the gap in the axial direction of the mandrel, and wherein after passage through the gap (54) the oriented plastic material of the blank is, by excess pressure therein, expanded into abutment against an inner defining surface (72) of a calibration sleeve (70) having channels (78) by means of which the temperature of said inner defining surface (72) is adjusted.

4. The method as claimed in claim 3, wherein the gap (54) is given a smallest gap width which exceeds the thickness of the oriented material.

5. The method as claimed in claim 3, wherein the oriented plastic material formed on orientation of the plastic material is brought into abutment against the mandrel (60) after the plastic material has substantially assumed a final thickness.

6. The method as claimed in claim 5, wherein after the crystallization energy has reached the defining surfaces of the thinner plastic material, the plastic material abuts against the orientation mandrel (60) substantially without any relative movement in relation to the mandrel in its axial direction.

7. The method as claimed in claim 3, wherein the surface temperature of the mandrel (60) is set at a level which is less than the glass transition temperature of the plastic material by at least approximately 5° C.

8. The method as claimed in claim 3, wherein the surface of the drawing ring (50) facing the mandrel (60) is set at a temperature which is less than the glass transition temperature of the plastic material by at least approximately 5° C.

9. The method according to claim 7 wherein the surface temperature of the mandrel (60) is set at a level which is less than the glass transition temperature of the plastic material by at least approximately 10° C.

10. The method according to claim 8 wherein the surface temperature of the drawing ring (50) facing the mandrel (60) is set at a temperature which is less than the glass transition temperature of the plastic material by at least approximately 10° C.

* * * * *

UNITED STATES PATENT AND TRADEMARK OFFICE
CERTIFICATE OF CORRECTION

PATENT NO. : 5,409,658
DATED : Apr. 25, 1995
INVENTOR(S) : Torsten Nilsson

It is certified that error appears in the above-indentified patent and that said Letters Patent is hereby corrected as shown below:

On title page, item [30] add the following:

PCT/SE91/00633   09/23/91.

Signed and Sealed this

Eighth Day of August, 1995

*Attest:*

BRUCE LEHMAN

*Attesting Officer*     *Commissioner of Patents and Trademarks*